(12) United States Patent
Pearce

(10) Patent No.: US 10,061,477 B2
(45) Date of Patent: Aug. 28, 2018

(54) GESTURE CONTROLLED USER INTERFACE

(71) Applicant: Promethean Limited, Blackburn, Lancashire (GB)

(72) Inventor: Nigel Pearce, Lancashire (GB)

(73) Assignee: Promethean Limited (GB)

( * ) Notice: Subject to any disclaimer, the term of this patent is extended or adjusted under 35 U.S.C. 154(b) by 329 days.

(21) Appl. No.: 14/979,171

(22) Filed: Dec. 22, 2015

(65) Prior Publication Data

US 2016/0139745 A1    May 19, 2016

Related U.S. Application Data

(63) Continuation of application No. 13/883,347, filed as application No. PCT/EP2011/069469 on Nov. 4, 2011, now Pat. No. 9,223,474.

(30) Foreign Application Priority Data

Nov. 5, 2010 (GB) .................................. 1018765.6

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 3/017* (2013.01); *G06F 3/0484* (2013.01); *G06F 3/0488* (2013.01); *G06F 3/04883* (2013.01)

(58) Field of Classification Search
None
See application file for complete search history.

(56) References Cited

U.S. PATENT DOCUMENTS

| 5,926,178 A | * | 7/1999 | Kurtenbach | .......... G06F 3/0482 715/834 |
| 6,448,987 B1 | * | 9/2002 | Easty | .................... G06F 3/0482 715/834 |

(Continued)

FOREIGN PATENT DOCUMENTS

| WO | 2003062978 | 7/2003 |
| WO | 2008133505 | 11/2008 |

(Continued)

OTHER PUBLICATIONS

Great Britain Examination Report, dated Sep. 21, 2017, from corresponding Great Britain Application No. GB1018765.6.

(Continued)

*Primary Examiner* — Hua Lu
(74) *Attorney, Agent, or Firm* — Brient IP Law, LLC; Alfred Steven Nugent, IV

(57) ABSTRACT

A method, in a computer system including an interactive display surface, of controlling the display of a user interface menu, the method comprising: displaying a menu option in each of a plurality of active display positions, each display position being located at one of a respective plurality of active radial positions radiating from a central position; detecting movement of a contact point on the interactive display surface; and changing the menu option displayed in each of the plurality of display positions in response to the detected movement of the contact point being inward or outward of the central position.

18 Claims, 9 Drawing Sheets

(51) Int. Cl.
   *G06F 3/0488*   (2013.01)
   *G06F 3/01*     (2006.01)
   *G06F 3/0484*   (2013.01)

(56) References Cited

U.S. PATENT DOCUMENTS

| | | | |
|---|---|---|---|
| 7,509,348 B2 | 3/2009 | Burtner et al. | |
| 7,600,201 B2 | 10/2009 | Endler et al. | |
| 7,644,372 B2 | 1/2010 | Russo | |
| 7,676,763 B2 | 3/2010 | Rummel | |
| 7,898,529 B2 | 3/2011 | Fitzmaurice et al. | |
| 7,941,765 B2 | 5/2011 | Fleck et al. | |
| 8,245,156 B2 | 8/2012 | Mouilleseaux et al. | |
| 8,386,961 B2 | 2/2013 | Buffet et al. | |
| 8,436,817 B2 | 5/2013 | Oh | |
| 8,549,432 B2 | 10/2013 | Warner | |
| 8,578,294 B2 | 11/2013 | Eom et al. | |
| 8,578,295 B2 | 11/2013 | Chmielewski et al. | |
| 8,930,834 B2 | 1/2015 | Sunday et al. | |
| 9,383,897 B2 | 7/2016 | Cragun et al. | |
| 2004/0212617 A1* | 10/2004 | Fitzmaurice | G06F 3/0481 345/440 |
| 2004/0221243 A1* | 11/2004 | Twerdahl | G06F 3/016 715/834 |
| 2005/0229116 A1* | 10/2005 | Endler | G06F 3/0482 715/862 |
| 2007/0180392 A1* | 8/2007 | Russo | G06F 3/0482 715/765 |
| 2007/0198949 A1* | 8/2007 | Rummel | G06F 3/0482 715/810 |
| 2007/0220444 A1* | 9/2007 | Sunday | G06F 3/0488 715/788 |
| 2008/0059913 A1* | 3/2008 | Burtner | G06F 3/0482 715/854 |
| 2009/0019397 A1* | 1/2009 | Buffet | G06F 3/0482 715/837 |
| 2009/0183100 A1* | 7/2009 | Eom | G06F 3/0482 715/769 |
| 2009/0187860 A1* | 7/2009 | Fleck | G06F 3/0482 715/834 |
| 2009/0327963 A1* | 12/2009 | Mouilleseaux | G06F 3/0482 715/834 |
| 2010/0134428 A1* | 6/2010 | Oh | G06F 3/0234 345/173 |
| 2010/0185985 A1* | 7/2010 | Chmielewski | G06F 3/0482 715/834 |
| 2010/0192103 A1* | 7/2010 | Cragun | G06F 3/04817 715/834 |
| 2010/0306702 A1* | 12/2010 | Warner | G06F 3/04817 715/811 |
| 2011/0066981 A1* | 3/2011 | Chmielewski | G06F 3/0482 715/834 |

FOREIGN PATENT DOCUMENTS

| | | |
|---|---|---|
| WO | 2009137992 | 11/2009 |
| WO | 2010018126 | 2/2010 |

OTHER PUBLICATIONS

International Preliminary Report on Patentability, dated May 16, 2013, from corresponding International Application No. PCT/EP2011/069469.

International Search Report, dated Jan. 11, 2012, from corresponding International Application No. PCT/EP2011/069469.

Great Britain Search Report, dated Mar. 8, 2011, from corresponding Great Britain Application No. GB1018765.6.

* cited by examiner

GESTURE CONTROLLED USER INTERFACE

CLAIM OF PRIORITY

This application is a continuation of U.S. patent application Ser. No. 13/883,347, filed Aug. 28, 2013, entitled, "Gesture Controlled User Interface," which is a national stage application under 35 U.S.C. 371 and claims the benefit of PCT Application No. PCT/EP2011/069469, having an international filing date of Nov. 4, 2011, which designated the United States, and which PCT application claims the benefit of Great Britain Patent Application No. 1018765.6 filed Nov. 5, 2010, the entire disclosures of which are incorporated herein by reference in their entirety.

FIELD OF THE INVENTION

The invention relates to interactive display surfaces, and particularly but not exclusively to touch-sensitive interactive display surfaces. The invention relates to the use of a gesture to control a user interface menu on an interactive display surface. The invention is particularly, but not exclusively, concerned with interactive display systems, such as used in classrooms in educational environments, incorporating interactive display systems.

DESCRIPTION OF THE RELATED ART

Interactive display surfaces, such as touch-sensitive display surfaces, are well-known in the art. In particular it is well-known in the art to provide touch sensitive display surfaces on portable electronic devices, including hand-held devices such as mobile telephones.

Interactive display surfaces, including touch-sensitive surfaces, are also known to be provided on large scale displays, such as in electronic whiteboards in educational classroom environments.

Interactive display surfaces allow a user to control an electronic device via input contacts—such as touch inputs—at the surface. The user may select applications and menu options, and enter data, using such a surface.

With reference to FIG. 1 there is illustrated an exemplary radial menu display of a touch-sensitive display surface. As illustrated in FIG. 1, nine displayed active circumference menu icon positions denoted by reference numerals $104_1$ to $104_9$ are positioned about a central point denoted by reference numeral 100. Each displayed active circumference menu icon position $104_1$ to $104_9$ is displayed as a circular graphical user icon (GUI). Each displayed active circumference menu icon position $104_1$ to $104_9$ includes menu icon information, or a menu option, which in the example of FIG. 1 is denoted by labels A to I in the respective circular positions denoted by reference numerals $104_1$ to $104_9$.

A hand is denoted by reference numeral 102. In a touch sensitive display surface, the hand 102 is used to select displayed menu icons, or more particularly a finger of the hand is used to select displayed menu icons. Thus the displayed active circumference menu icon positions $104_1$ to $104_9$ are preferably sized to ensure that the finger of the hand 102 can be used to select one of the positions, without there being any ambiguity as to the position being selected, for example by avoiding the positions being located too close together.

To ensure that the menu icon positions are presented of sufficient size to allow them to be selected by touch, without any ambiguity in the selection process, and also to ensure that the overall size of the displayed menu does not unduly consume the display surface, there is a limit as to the number of displayed active circumference menu icon positions 104 which may be displayed. In the example of FIG. 1 nine active circumference menu icon positions are displayed, but in other arrangements a greater or fewer number of active circumference menu icon positions may be displayed as appropriate.

In any arrangement, the number of displayed active circumference menu icon positions may not be sufficient to allow all menu options to be displayed simultaneously. As noted above, it may not be practical to increase the number of displayed active circumference menu icon positions, as to do so would result in the positions being sized or located as to potentially result in the selection of an incorrect displayed icon.

As also noted above, increasing the overall size of the menu to increase the number of menu icon positions displayed may not be practical, as to do so would consume display space.

Consequently, the number of menu options displayed has to be limited, in order to ensure that the displayed active circumference menu icon positions are sufficiently spaced.

It is an aim of the invention to provide an improved technique for controlling the display of, and controlling the selection of options from, a radial menu displayed on an interactive display surface such as a touch-sensitive display.

SUMMARY OF THE INVENTION

In accordance with the invention there is provided a method, in a computer system including an interactive display surface, of controlling the display of a user interface menu, the method comprising: displaying a menu option in each of a plurality of active display positions, each display position being located at one of a respective plurality of active radial positions radiating from a central position; detecting movement of a contact point on the interactive display surface; and changing the menu option displayed in each of the plurality of display positions in response to the detected movement of the contact point being inward or outward of the central position.

An active display position is preferably a display position in which the displayed menu option can be selected by contact on the interactive display surface at the display position.

Movement of a contact point is preferably detected in dependence on determining a movement from a first to a second location on the surface, whilst maintaining contact with the surface.

The step of detecting movement of a contact point on the interactive surface may include a heuristic for determining that the movement of the contact point corresponds to a radial gesture based on an angle of the detected movement with respect to a radius extending from the central point. In the heuristic a detected movement within a predefined angle of a radius may be determined to comprise a radial gesture.

The radial gesture may be determined as being an inward or an outward radial gesture in dependence on whether, respectively, the radial gesture is toward or away from the central point.

The method may further comprise the steps of: displaying a menu option in each of a plurality of inner display positions, each inner display position being associated with an active display position, each inner display position being located at one of a respective plurality of inner radial positions radiating from the central position, the inner radial positions being located a shorter distance from the central point than the respective active radial positions; changing the menu option displayed in each of the plurality of active display positions to the menu option in each of the plurality of associated inner display positions in response to the detected movement of the contact point being outward of the central position; and changing the menu option displayed in each of the plurality of inner display positions to the menu option in each of the plurality of associated active display positions in response to the detected movement of the contact point being inward of the central position.

The inner display positions are preferably not active display positions, and thus preferably do not represent menu options currently available for selection by a user.

The distance of each of the inner display positions from the central point is preferably less than the distance of each of the active display positions from the central point.

The method may further comprise the steps of: displaying a menu option in each of a plurality of outer display positions, each outer display position being located at one of a respective plurality of outer radial positions radiating from the central position, the outer radial portions being located a further distance from the central point than the respective active radial position; changing the menu option displayed in each of the plurality of active display positions to the menu option in each of the plurality of associated outer display positions in response to the detected movement of the contact point being inward of the central position; and changing the menu option displayed in each of the plurality of outer display positions to the menu option in each of the plurality of associated active display positions in response to the detected movement of the contact point being outward of the central position.

The outer display positions are preferably not active display positions, and thus preferably do not represent menu options currently available for selection by a user.

The distance of each of the outer display positions from the central point is preferably greater than the distance of each of the active display positions from the central point.

The method may further comprise the step of rotating a menu option displayed in each of the plurality of active display positions in response to the detected movement of the contact point being rotational movement about the central position.

The active circumference about a central position is preferably not a displayed circumference, but represents a notional or geometric circumference about the central position along which the active display positions are displayed. In an arrangement in which the active display positions are circular icons, the active circumference may be a notional circumference about the central position, and the central point of each of the circular active display positions may be coincident with the notional circumference.

The menu options in each of the active display positions may represent a current set of menu options available for selection by a user.

The menu options in each of the inner display positions and/or the outer display positions may represent a respective set of menu options which is available for selection by a user in response to the detected movement of the contact point being inward or outward of the central position such as to represent a radial gesture.

The interactive display surface is preferably an interactive display surface of an interactive display system. The interactive display surface is preferably a touch-sensitive display surface.

In accordance with the invention there is further provided a computer system associated with an interactive display surface, adapted to control the display of a user interface menu, comprising: a menu display module adapted to display a menu option in each of a plurality of active display positions, each display position being located at one of a respective plurality of active radial positions radiating from about a central position; a touch detection module adapted to detect movement of a contact point on the interactive display surface; the menu display module further being adapted to change the menu option displayed in each of the plurality of display positions in response to the detected movement of the contact point being inward or outward of the central position.

The computer system may further include a heuristic module for determining that the movement of the contact point corresponds to a radial gesture based on an angle of the detected movement with respect to a radius extending from the central point.

The menu display module may be further adapted to display a menu option in each of a plurality of inner display positions, each inner display position being associated with an active display position, each inner display position being located at one of a respective plurality of inner radial positions radiating from the central position, the inner radial positions being located a shorter distance from the central point than the respective active radial positions; change the menu option displayed in each of the plurality of active display positions to the menu option in each of the plurality of associated inner display positions in response to the detected movement of the contact point being outward of the central position; and change the menu option displayed in each of the plurality of inner display positions to the menu option in each of the plurality of associated active display positions in response to the detected movement of the contact point being inward of the central position.

The menu display module may be further adapted to display a menu option in each of a plurality of outer display positions, each outer display position being located at one of a respective plurality of outer radial positions radiating from the central position, the outer radial positions being located a further distance from the central point than the respective active radial position; change the menu option displayed in each of the plurality of active display positions to the menu option in each of the plurality of associated outer display positions in response to the detected movement of the contact point being inward of the central position; and change the menu option displayed in each of the plurality of outer display positions to the menu option in each of the plurality of associated active display positions in response to the detected movement of the contact point being outward of the central position.

The computer system may further include a rotational gesture recognition module adapted to rotate a menu option displayed in each of the plurality of active display positions on the active circumference in response to the touch detection module detecting movement of the contact point being rotational movement about the central position.

BRIEF DESCRIPTION OF THE FIGURES

The invention is now described by way of example with reference to the accompanying Figures in which.

DESCRIPTION OF PREFERRED EMBODIMENTS

The invention is now described by way of exemplary arrangements and embodiments. One skilled in the art will appreciate that the following description sets out example arrangements for describing the invention and its operation, and does not represent restrictions on the scope of the claimed invention.

The invention is described herein in the context of an interactive display surface being a touch-sensitive display surface. A particular advantage of a system incorporating a touch-sensitive display surface in which the invention and its embodiments may advantageously be used is described below with reference to FIG. 12. However the invention is not limited to touch-sensitive display systems, or the exemplary system of FIG. 12. For example the invention could be utilised in interactive display surface incorporating camera technology or electromagnetic pointer technology for detecting a contact point at the interactive surface.

The invention may be advantageously incorporated in a multi-touch environment that is a touch sensitive display surface which is adapted to detect multiple touch inputs—such as inputs from different users—simultaneously. Any touch inputs referred to in the following description may be provided by any one of a plurality of users.

The exemplary arrangement described herein below is of a radial menu in which the menu options are distributed on a circumference around a central point. However the invention is not limited to such a circular menu. The radial menu may form, for example, a square shape rather than a circular shape.

Figure 1:
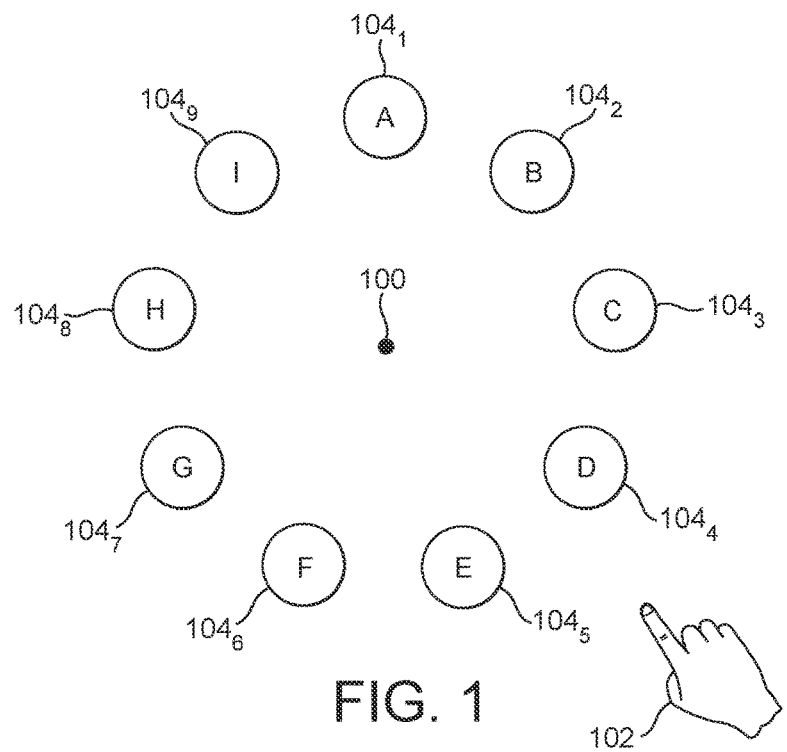
FIG. 1 illustrates a radial menu of a user interface.
Figure 2:
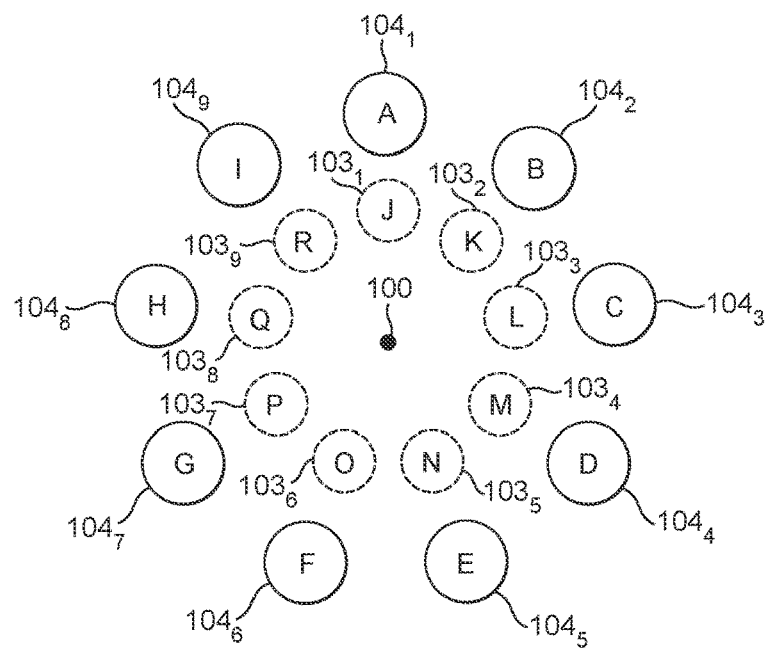
FIG. 2 illustrates an improvement to a radial menu of user interface in accordance with an embodiment of the invention.

With reference to FIG. 2, there is illustrated an improvement in a displayed radial menu in accordance with an embodiment of the invention. It should be noted that in the following description when the same reference numeral is used in different Figures, this denotes the same feature appearing in different Figures.

With reference to FIG. 2, the displayed active circumference menu icon positions $104_1$ to $104_n$, respectively containing menu information or menu options A to I, are displayed. The displayed active circumference menu icon positions are each located on the circumference of a circle plotted about the central point 100. Each displayed active circumference menu icon position is positioned along a radius extending from the central point 100, and hence the displayed menu is termed a radial menu.

In addition, displayed inner circumference menu icon positions $103_1$ to $103_9$, displaying menu information or menu options J to R respectively, are additionally shown. The displayed inner circumference menu icon positions $103_1$ to $103_9$ are generally disposed on the circumference of a circle plotted around the central point 100, similar to the displayed active circumference menu icon positions $104_1$ to $104_9$, each displayed inner circumference menu icon position being positioned along a radius extending from the central point 100.

The displayed inner circumference menu icon positions $103_1$ to $103_9$ are displayed within the circumference formed by the displayed active circumference menu icon positions $104_1$ to $104_9$. Thus the radial distance of each inner circumference menu icon position is less than the radial distance of each active circumference menu icon position.

Further, the displayed inner circumference menu icon positions $103_1$ to $103_9$ are displayed in a smaller size than the displayed active circumference menu icon positions $104_1$ to $104_9$.

Preferably the inner circumference menu icon positions $103_1$ to $103_9$ are not available for active selection, and are displayed in a faint or shadow format, such that they are visible to the user but indicated as not selectable by the user. This is denoted in the Figures by the presentation of the displayed inner circumference menu icon positions $103_1$ to $103_9$ as circular positions having a dashed outline.

The displayed active circumference menu icon positions $104_1$ to $104_9$ are available for user selection, and represent active menu options. These are displayed in a regular display format, denoted in the Figures by a solid outline.

The menu information or menu options J to R of the displayed inner circumference menu icon positions $103_1$ to $103_9$ represent additional menu options to the menu options A to I of the displayed active circumference menu icon positions $104_1$ to $104_9$. However as mentioned above, the displayed inner circumference menu icon positions $103_1$ to $103_9$ are not selectable positions. The presentation of the additional menu information J to R in the inner circumference menu icon positions $103_1$ to $103_9$ indicates to the user that additional menu options are available, other than those specifically provided in the displayed active circumference menu icon positions $104_1$ to $104_2$.

The displayed inner circumference menu icon positions are preferably not made available for selection due to their size which, as set out in the background section above, may not permit reliable selection of the options.

In accordance with an embodiment of the invention, the set of menu information J to R may be moved from the displayed inner circumference menu icon positions $103_1$ to $103_9$ to the displayed active circumference menu icon positions $104_1$ to $104_9$ respectively, in dependence upon a radial gesture, as further described with reference to FIG. 3.

In order to allow for the transfer of menu information between the displayed active circumference menu icon positions and the displayed inner circumference menu icon positions, each active icon position $104_1$ to $104_9$ is associated with—or mapped to—inner icon position $103_1$ to $103_9$ respectively.

Figure 3:
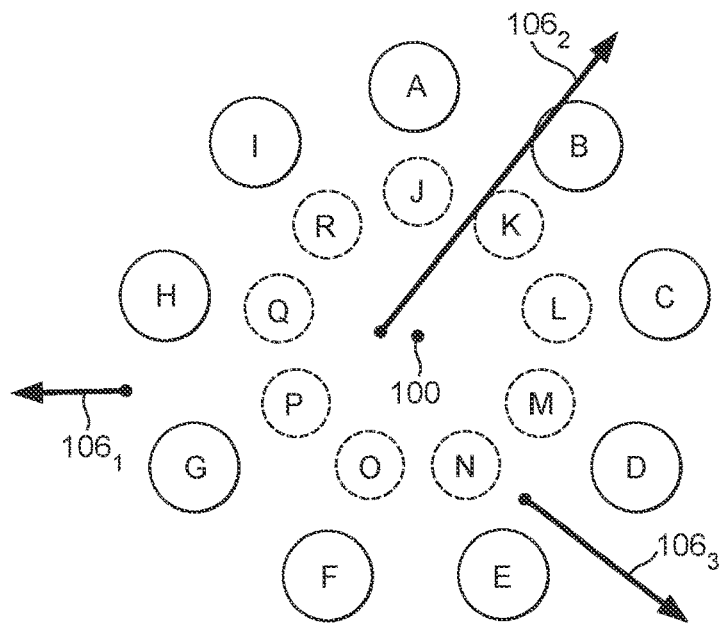
FIG. 3 illustrates outward radial gestures for controlling the radial menu of FIG. 2 in an embodiment.

With reference to FIG. 3, a user may, by touch, provide an outward radial gesture such as any one of the gestures $106_1$, $106_2$, $106_3$ of FIG. 3. Each of the outward radial gestures 106 of FIG. 3 generally represents a movement outward from the central point 100, although may not be exactly along the radius extending from the central point 100.

A heuristic is preferably provided for determining whether the movement associated with the gesture corresponds to a radial gesture, based on an angle of the gesture with respect to a radius extending from the central point 100. A heuristic is an experience-based technique for learning. A heuristic method comes to an optimal conclusion as quickly as possible. A heuristic is intended to gain computational performance or conceptual simplicity, potentially at the cost of accuracy or precision. In user interface interaction, heuristic evaluation is a usability-testing technique devised by expert usability consultants. In heuristic valuation, the user interface is reviewed by experts and its compliance to usability heuristic—broadly stated, characteristics of a good user interface, based on prior experience—and any violating aspects are recorded.

In a preferred arrangement, if the gesture is determined to define a line of movement within a predefined angle of such a radius, it is determined to be a radial gesture.

A radial gesture is one that appears to eliminate one path from, or appears to converge toward a path on, a point; like the spokes of a hub from a bicycle wheel. A gesture is preferably detected as a result of a contact point on the surface being determined to move from a first to a second location on the surface, whilst maintaining contact with the surface. The movement may be required to be of a minimum length to be identified as a gesture. The movement, or either contact point, may be required to be coincident with a certain area of the surface to be identified as a gesture. The gesture may be detected based on proximity to the surface rather than direct contact with the surface.

Figure 4:
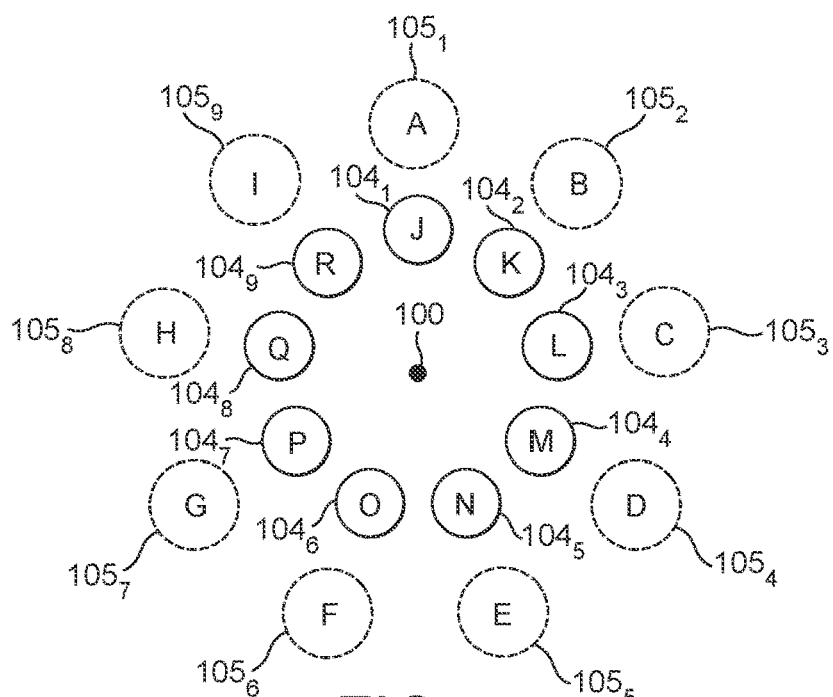
FIG. 4 illustrates a radial menu of a user interface in an embodiment.

With reference to FIG. 4, following a radial gesture such as the gestures $106_1$ to $106_3$ of FIG. 3, the menu information J to R is transferred to the respective displayed active circumference menu icon positions $104_1$ to $104_9$, from which positions the menu information may be subsequently selected by a user. The transfer of the menu information is based on the association of the positions $103_1$ to $103_9$ with the positions $104_1$ to $104_9$.

As further illustrated in FIG. 4, in a further arrangement responsive to such a gesture to transfer menu information from the displayed inner circumference menu icon positions to the displayed active circumference menu icon positions, the menu information previously included in the displayed active circumference menu icon positions $104_1$ to $104_9$ is moved to a corresponding set of respective displayed outer circumference menu icon positions $105_1$ to $105_9$. Thus the respective outer circumference menu icon positions $105_1$ to $105_9$ are illustrated as containing the menu information options A to I following the outward radial gesture 106 of FIG. 3.

In order to allow for the transfers of menu information between the displayed active circumference menu icon positions and the displayed outer circumference menu icon positions, each active icon position $104_1$ to $104_9$ is associated with—or mapped to—an outer icon position $105_1$ to $105_9$ respectively.

As illustrated in FIG. 4, the displayed outer circumference menu icon positions $105_1$ to $105_9$ are disposed outside the circumference of the displayed active circumference menu icon positions $104_1$ to $104_9$. Thus the radial distance of each outer circumference menu icon position is greater than the radial distance of each active circumference menu icon position.

Further the displayed outer circumference menu icon positions $105_1$ to $105_9$ are preferably displayed in a larger size than the active circumference menu icon positions $104_1$ to $104_9$.

As with the inner circumference menu icon positions $103_1$ to $103_9$, the outer circumference menu icon positions $105_1$ to $105_9$ preferably do not represent active icons available for selection by the user, but represent additional menu options which may be moved into the active circumference menu icon positions $104_1$ to $104_9$. They are preferably displayed in a faint or shadow format, as denoted by a dashed outline in the Figures, to denote that they are not actively available for selection.

Figure 5:
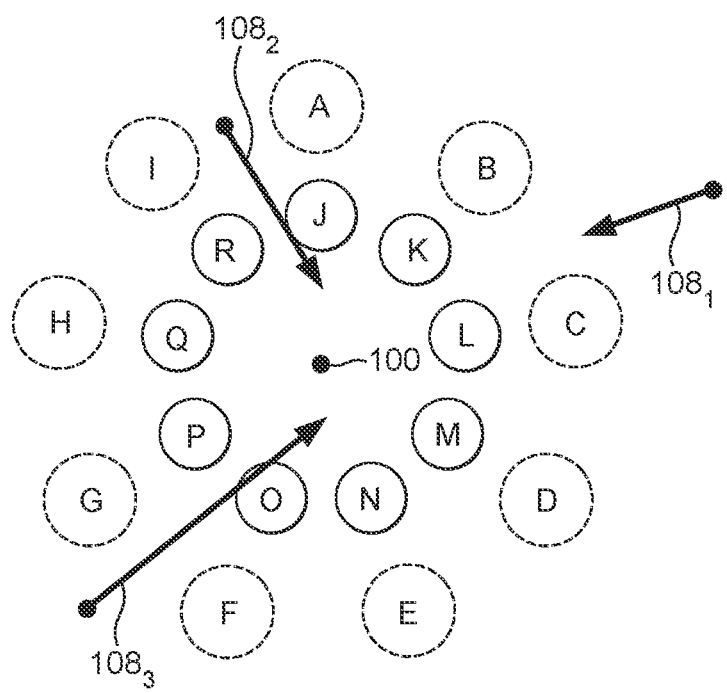
FIG. 5 illustrates inward radial gestures for controlling the radial menu of FIG. 4 in an embodiment.

With reference to FIG. 5, there is illustrated the use of inward radial gestures $108_1$ to $108_3$ to move the menu option information A to I in the outer circumference menu icon positions $105_1$ to $105_9$ into the respective active circumference menu icon positions $104_1$ to $104_9$. Illustrated in FIG. 5 are three inward radial gestures $108_1$ to $108_3$. As with the outward radial gestures 106, the inward radial gestures 108 are not required to exactly traverse the radius into the central point 100, but generally represent a gesture moving radially inwards towards the central point 100.

The heuristic discussed above is preferably used for identifying a radial gesture. The detection of movement to be interpreted as a gesture for an inward radial gesture may be the same as for an outward radial gesture, as discussed above.

Following an inward radial gesture, such as inward radial gestures $108_1$ to $108_3$ of FIG. 5, the displayed information reverts to the format illustrated in FIGS. 2 and 3, with the menu information A to I displayed in the respective active circumference menu icon positions $104_1$ to $104_9$, and the menu information J to R being displayed in the inner circumference menu icon positions $103_1$ to $103_9$.

The examples described with reference to FIGS. 2 to 5 illustrate an arrangement in which there is provided two levels of menu information. A first level of menu information A to I may be considered to be a first set of menu options, and a second level of menu information J to R may be considered to be a second set of menu options.

The principles as described hereinabove may be further extended to additional sets of menu options. With respect to FIG. 6, there is illustrated an arrangement in which menu information options are displayed in each of the displayed inner circumference menu icon positions $103_1$ to $103_9$, each of the displayed active circumference menu icon positions $104_1$ to $104_9$, and each of the displayed outer circumference menu icon positions $105_1$ to $105_9$.

Figure 6:
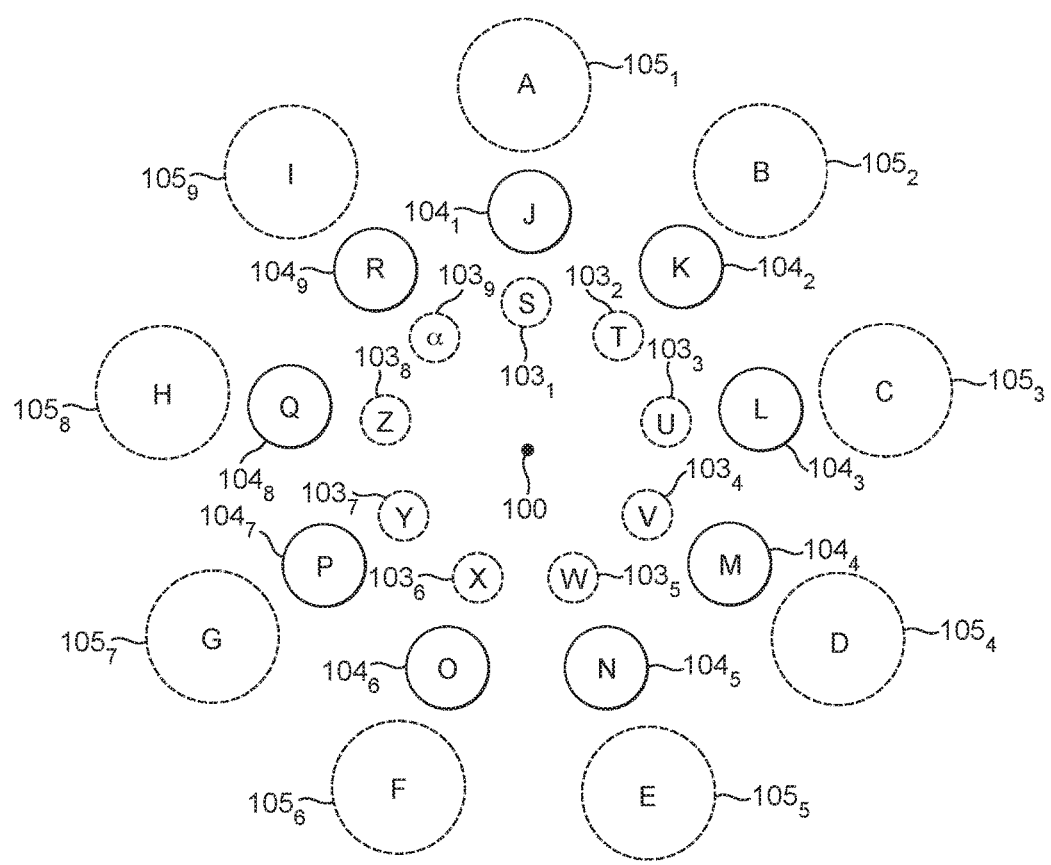
FIG. 6 illustrates a radial menu of a user interface in an embodiment.

As illustrated in FIG. 6, in this example the set of menu information A to I is displayed in the displayed outer circumference menu icon positions $105_1$ to $105_9$, which as described above are not options available for selection by the user, but represent a set of menu information which may be presented in the displayed active circumference menu icon positions $104_1$ to $104_9$ responsive to an inward radial gesture 108.

The displayed inner circumference menu icon positions $103_1$ to $103_9$ display a set of menu information S to Z and alpha respectively. Again, as noted above, the displayed inner circumference menu icon positions $103_1$ to $103_9$ do not contain menu information which is available for selection by the user, but contain menu information which may be transferred to active circumference menu icon positions $104_1$ to $104_9$ responsive to an outward radial gesture 106.

The menu information options J to R are displayed in the displayed active circumference menu icon positions $104_1$ to $104_9$, and are available for selection by the user.

Figure 7:
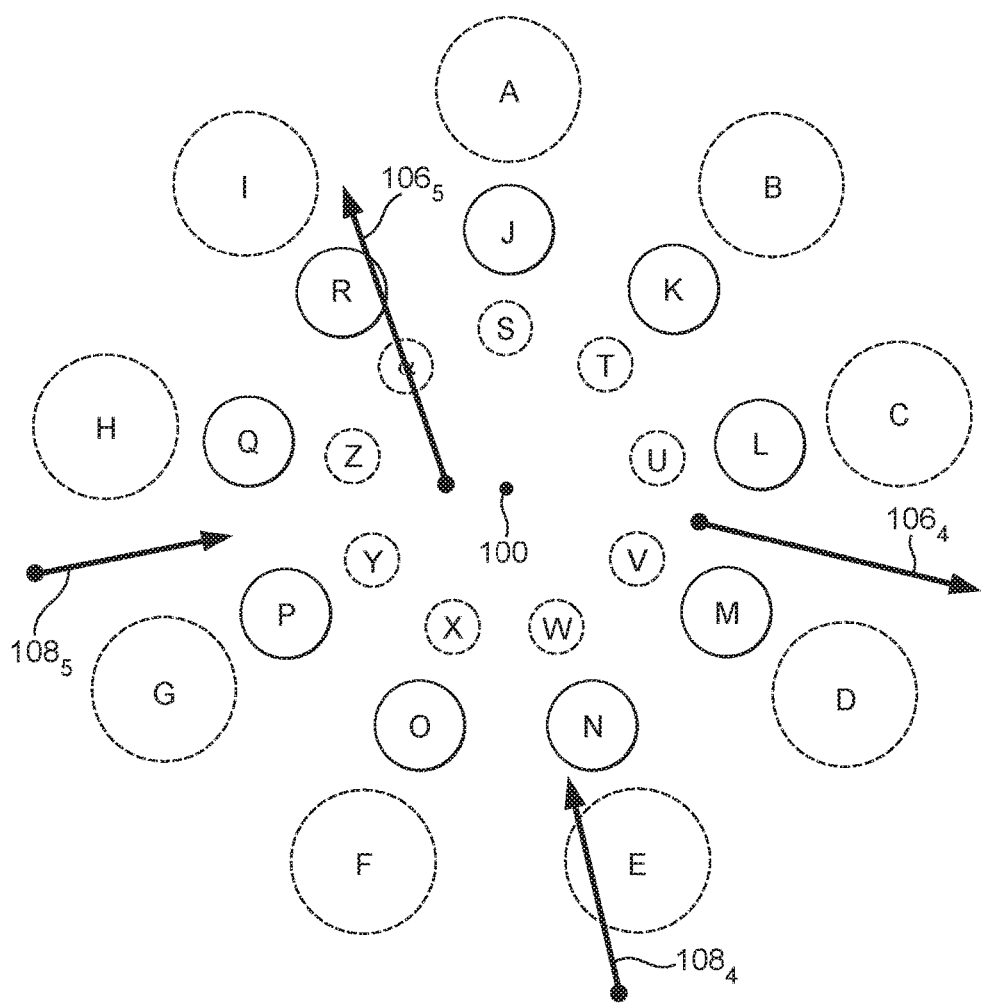
FIG. 7 illustrates inward and outward radial gestures for controlling the radial menu of FIG. 6 in an embodiment.

With reference to FIG. 7, there is illustrated outward radial gestures $106_4$ and $106_5$ which may result in information being transferred from the displayed inner circumference menu icon positions to the respective displayed active circumference menu icon positions, and in turn information being transferred from the displayed active circumference menu icon positions to the displayed outer circumference menu icon positions.

Also illustrated in FIG. 7 is inward radial gestures $108_4$ and $108_5$, which represent gestures which would result in the information displayed in the displayed outer circumference menu icon positions being transferred to the respective displayed active circumference menu icon positions, and similarly the information displayed in the displayed active circumference menu icon positions being transferred to the displayed respective inner circumference menu icon positions.

It will be appreciated that the principles set out hereinabove may be extended to additional levels of menu information, such that additional displayed inner or outer circumference menu icon positions may be displayed.

It should also be understood that more than one set of displayed active circumference menu icon positions may be displayed.

Still further, the display of menu options in the displayed inner circumference menu icon positions and displayed active circumference menu icon positions represents a preferable implementation. In an alternative implementation only the menu content information currently occupying the displayed active circumference menu icon positions $104_1$ to $104_9$ may be displayed, but with the information therein being changed responsive to an outward radial gesture 106 or an inward radial gesture 108, in accordance with a next or previous set of menu content information options which is not otherwise displayed. That is, the inner and outer circumference menu icon positions may not be displayed.

Figure 8:
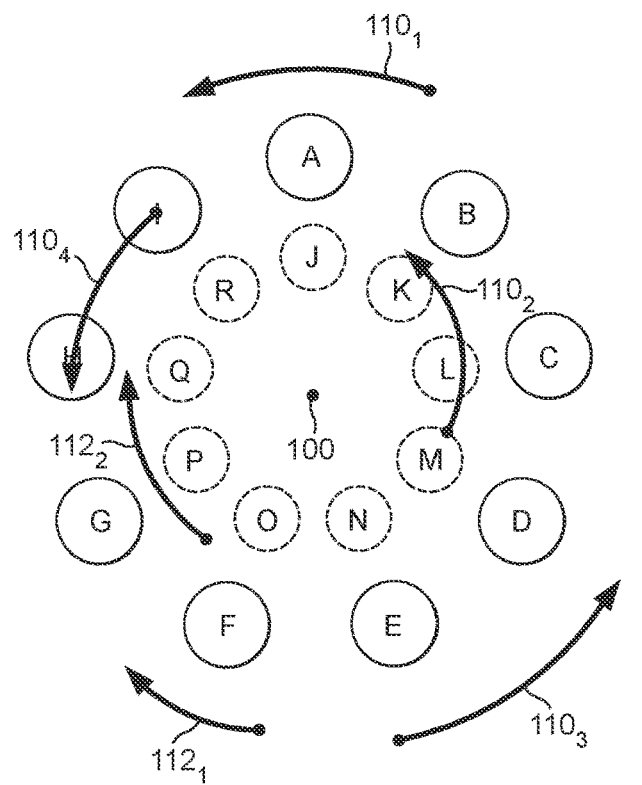
FIG. 8 illustrates clockwise and counter-clockwise rotational gestures for controlling the radial menu of FIG. 2 in an embodiment.

As illustrated in FIG. 8, in addition to the control of the menu using radial gestures, rotational gestures may also be used in order to control the menu. FIG. 8 illustrates a displayed menu corresponding to the arrangement of FIG. 2, and additionally showing example counter-clockwise rotational gestures $110_1$ to $110_4$, and example clockwise rotational gestures $112_1$ and $112_2$.

Responsive to a counter-clockwise rotational gesture 110 or a clockwise rotational gesture 112, the menu information contained in the active circumference menu icon positions $104_1$ to $104_9$ may be rotated by a certain number of displayed positions. The amount of positions by which menu information is rotated may be dependent upon the length of the rotation gesture 110 or 112. In addition, if any information is displayed in the inner circumference menu icon positions 103 or the outer circumference menu icon positions 105, this information may be similarly rotated.

Figure 9:
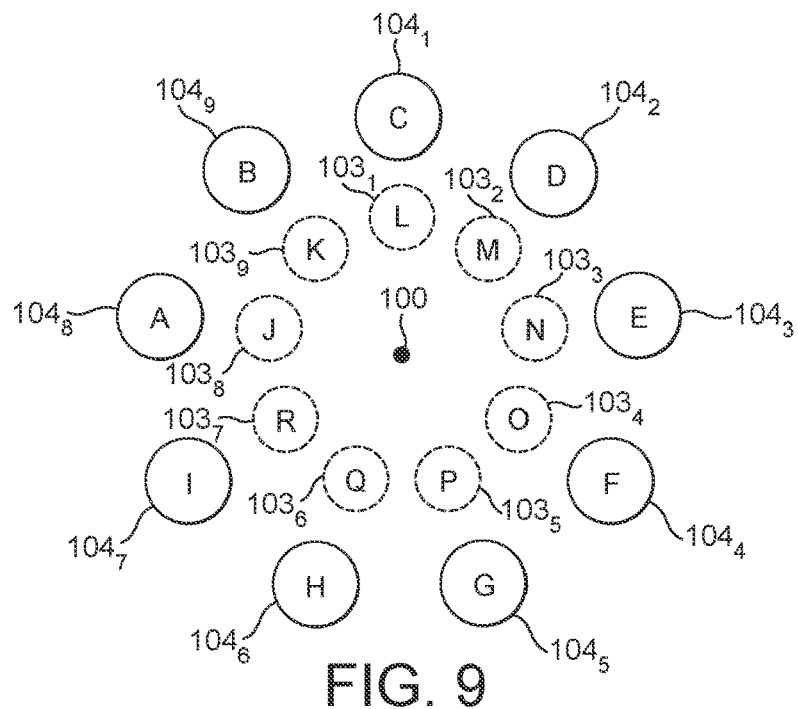
FIG. 9 illustrates an adaptation of the radial menu of FIG. 2 following a rotational gesture in an embodiment.

With reference to FIG. 9, there is illustrated an example following a counter-clockwise rotational gesture 110 such as gesture $110_3$ of FIG. 8. As a result, the content included in the displayed active circumference menu icon positions $104_1$ to $104_9$ is rotated by two menu icon positions, such that the content information A to I is located respectively in the displayed positions $104_8$ to $104_7$. Similarly the content information J to R displayed in the displayed inner circumference menu icon positions is now displayed in the displayed positions $103_8$ to $103_7$ respectively.

A rotational gesture is preferably detected by applying a heuristic.

Figure 10:
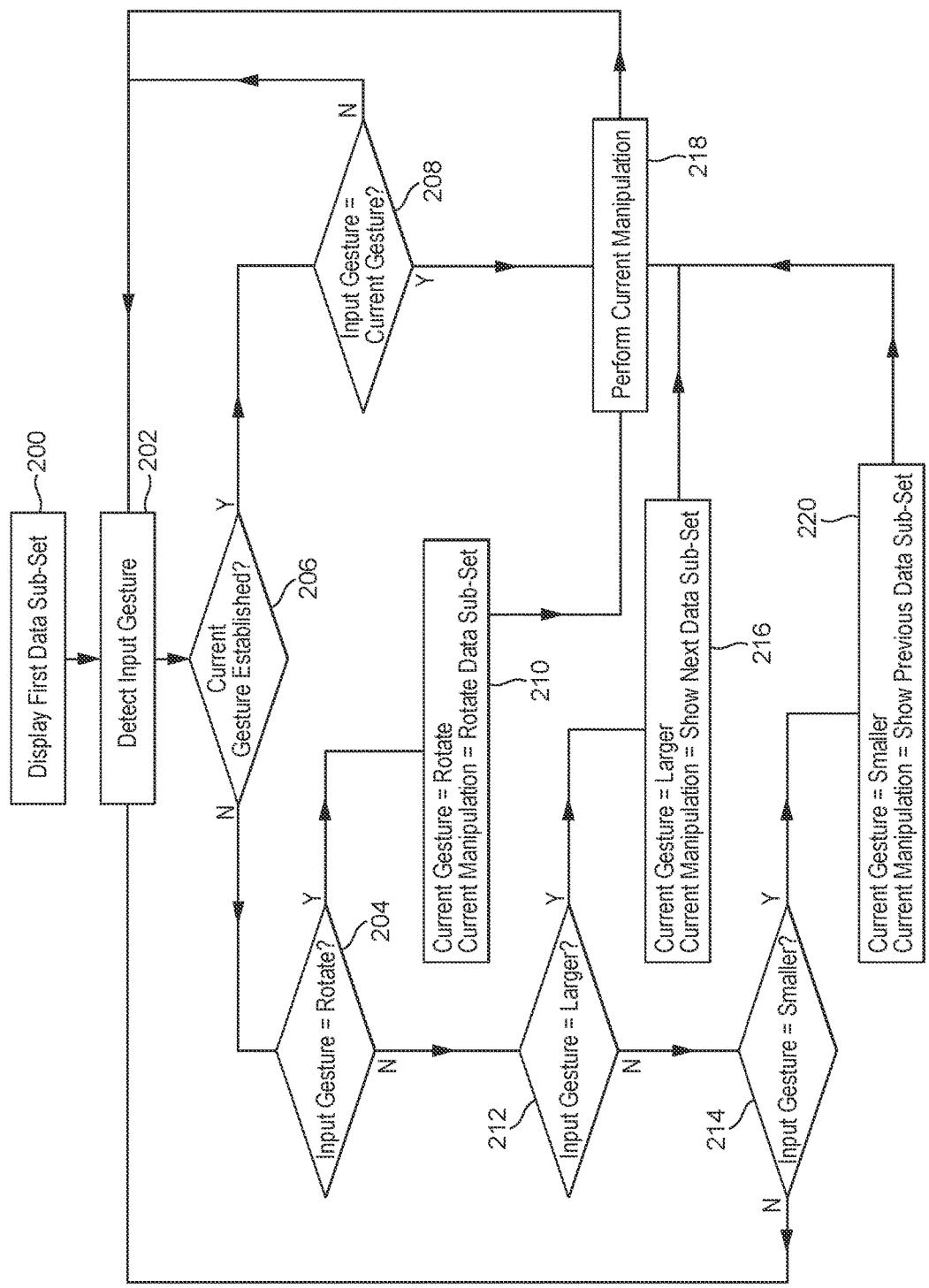
FIG. 10 illustrates a process flow for implementing a preferred embodiment of the invention.

The operation of a process in accordance with the principles of the invention, as described with reference to FIGS. 2 to 9 is now further described with reference to the flow diagram of FIG. 10.

In a first step 200, a first data sub-set is displayed in the displayed active circumference menu positions $104_1$ to $104_9$. This data sub-set represents a first set of menu information.

In a step 202 inputs at the interactive display surface are monitored, for detection of an input gesture. Following detection of an input gesture in step 202, an assessment is made in step 206 with respect to the gesture.

In step 206 it is determined whether a gesture has already been established, i.e. whether a process is in operation as a result of an already detected gesture. If that is the case, then the process moves to step 208 and it is determined whether the detected input gesture is in fact the current input gesture. If that is the case, in step 218 the current manipulation as a result of the current input gesture is performed, and thereafter the process moves to step 202.

If in step 208 it is determined that the input gesture that has been detected is not the current input gesture, then the process returns to step 202.

In step 206 if it is determined that no current gesture is established, then in step 204 a determination is made as to whether the current input gesture is a rotate gesture. If the input gesture is determined to be a rotate gesture, then in step 210 the current gesture is set as a "rotate" gesture, and the current manipulation is set as "rotate data sub-set". In step 218 the current manipulation is then performed, before the process reverts to step 202.

If in step 204 it is determined that the input gesture is not a rotate gesture, then in step 212 it is determined whether the input gesture is an outward radial gesture, which may also be considered to be a "larger" gesture. If it is determined that the input gesture is an outward radial gesture, then the process moves on to step 216, the current gesture is set to be "larger", and the current manipulation is set to be "show next data sub-sets". The process then moves on to step 218 to perform the manipulation, and then reverts to step 202.

If in step 212 it is determined that the input gesture is not an outward radial gesture, then in step 214 it is determined whether the gesture is an inward radial gesture, which may also be considered to be a "smaller gesture". If in step 214 it is determined that the input gesture is an inward radial gesture, then the process moves on to step 220, and the current gesture is set to be a "smaller" gesture, and the current manipulation is set to be to "show previous data sub-set". The manipulation is then performed in step 218, before the process reverts to step 202.

If in step 214 it is determined that the input gesture is not an inward radial gesture, then the process reverts to step 202 to detect further input gestures.

As mentioned above, the circular implementation of the radial menu is only exemplary. The display positions need not be provided an active, inner or outer circumference. More generally the display positions are radial positions radiating from a central point. The plurality of active display positions are located at a plurality of active radial positions radiating from the central point in a respective plurality of directions. The plurality of inner display positions are located at a plurality of inner radial positions radiating from the central point in a respective plurality of directions. The inner radial positions are a shorter distance from the central point than the respective active radial positions. The inner radial positions are preferably located on the same radii as the respective active radial positions. The plurality of outer display positions are located at a plurality of outer radial positions radiating from the central point in a respective plurality of directions. The outer radial positions are a further distance from the central point than the respective active radial positions. The outer radial positions are preferably located on the same radii as the respective active radial positions.

Figure 11:
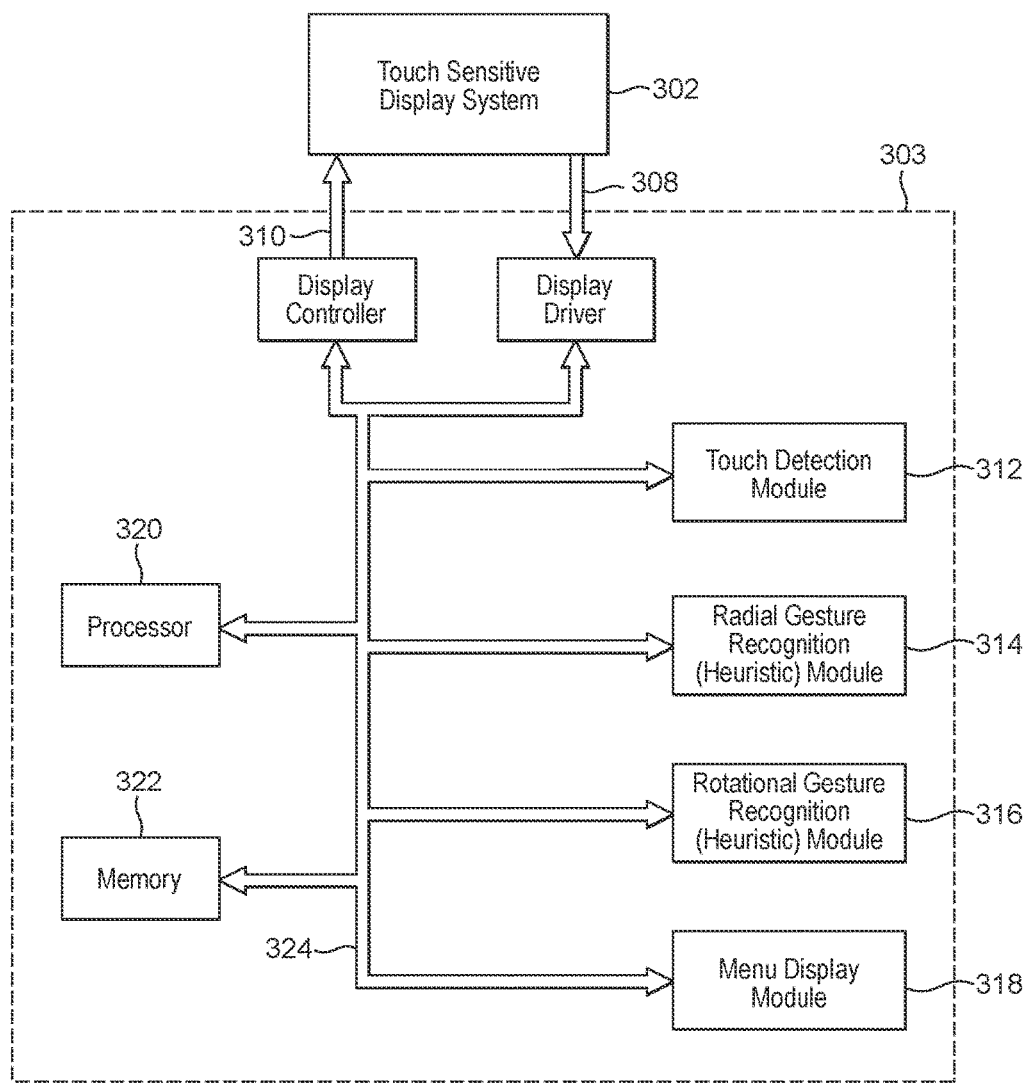
FIG. 11 illustrates the implementation of a computer system for implementing a preferred embodiment of the invention.

With reference to FIG. 11, there is illustrated the main functional blocks of a computer system adapted to implement the invention. One skilled in the art will appreciate that additional functional blocks other than those illustrated in FIG. 11 are required in order to implement an appropriate computer system, but the principle functional blocks associated with the operation of the invention are illustrated.

As illustrated in FIG. 11, a touch-sensitive display system 302 is provided which includes a touch-sensitive display surface, and interfaces with a computer system generally denoted by reference numeral 303. A display controller 306 provides display inputs to the touch-sensitive display system 302 on communication lines 310. A display driver 304 receives detected inputs at the touch-sensitive display surface at the touch-sensitive display system 302 on communication lines 308. An internal communications bus 324 interconnects the various functional components of the computer system 303. In addition to the display controller 306 and the display driver 304, the computer system 303 includes a processor 320, a memory 322, a touch detection module 312, a radial gesture recognition (heuristic) module 314, a rotational gesture recognition (heuristic) module 316, and a menu display module 318.

Each of the modules 312, 314, 316 and 318 is adapted to perform a functionality in the computer system to support operation of features of the invention and the preferred arrangements as set out herein. Data used in the processing of these functions may be stored in the memory 322, and the processing of the functions may be carried out under control of the processor 320.

Figure 12:
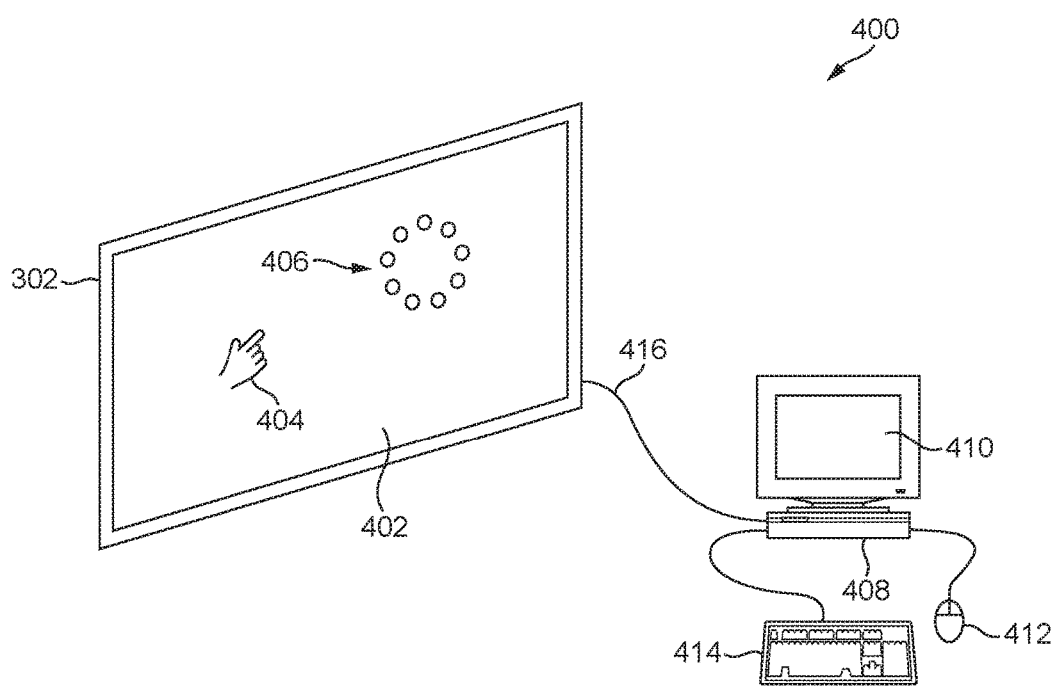
FIG. 12 illustrates a preferred implementation of the invention in an interactive display system in a classroom environment.

Further with reference to FIG. 12, there is illustrated an exemplary environment in which the principles of the present invention may be utilised in an interactive display system. FIG. 12 illustrates an interactive display system generally denoted by reference numeral 400, including a touch-sensitive display system 302, and a computer 408.

The touch-sensitive display system 302 includes a touch-sensitive display surface 402, on which is displayed graphical elements such as a menu 406 corresponding to the radial menu described herein in various embodiments. Also illustrated in FIG. 12 is a hand 404 of a user being used at the touch-sensitive display surface 402 to provide inputs.

The computer 408 is connected to the touch-sensitive display system 302 via a connection 416, which may be wireless or wired. Computer software including applications running on the computer system 408 control the display of graphical information on the touch-sensitive display surface 402, and are controlled by inputs detected at the touch-sensitive display surface 402. The computer system 408 may be provided with its own monitor 410, which may display the same information as displayed on the interactive display surface 402 or different information. As illustrated in FIG. 12, the computer system 408 may also be connected to other types of input device, such as a mouse input device 412 and a keyboard input device 414, and receive and process inputs from such devices.

An interactive display system 400 as illustrated in FIG. 12 may be provided in a classroom environment for educational purposes. The touch-sensitive display system 302 may be provided as a large vertical display surface, which is viewable by a large number of students in a classroom. The provision of touch inputs at the touch-sensitive display surface 402 may be provided by a teacher or students in a classroom.

FIG. 12 represents only one exemplary implementation of the invention. The touch-sensitive display system 302 may provide a touch-sensitive display surface 402 which is orientated in a direction other than a vertical direction, such as a horizontal surface.

The touch-sensitive display system 302 may also be provided as a small-scale device, such as a portable or hand-held device, with a touch-sensitive display surface.

Further, and as noted hereinabove, the invention is not limited in its applicability to touch-sensitive display systems, and in general is applicable to an interactive display system.

The interactive display surface may be an admissive surface, or may be a surface onto which images are projected. The invention is not limited to any particular type of technology for an interactive display surface, or more particularly to any particular type of technology for a touch-sensitive display surface.

As will be clear to one skilled in the art, numerous embodiments of interactive display systems may be used to practice the present invention, e.g. to run the methods described herein as part of an interactive program stored on storage media such as computer memory storage or peripheral memory storage which is accessible by a computer, and the above description of an exemplary application in an interactive display system is not intended to limit the breadth of coverage provided by the invention. For example, the program software for practising the present invention may be stored on a disk (such as a CD or other data storage media), may be downloaded into a computer's memory to be run, or may run from disk.

One skilled in the art will appreciate various modifications and adaptations to the invention as described hereinabove in order to implement the invention in alternative scenarios, without diverting from the scope of the invention as claimed. Embodiments described herein are not mutually exclusive, and aspects of the embodiments described herein may be combined in full or in part.

What is claimed:

1. A method, in a computer system including an interactive display surface, of controlling the display of a user interface menu, the method comprising:
   a. displaying, by at least one processor, a menu information option in each of a plurality of predetermined static active display positions, each display position being located at one of a respective plurality of active radial positions radiating from a central position;
   b. detecting, by at least one processor, movement of a contact point on the interactive display surface; and
   c. changing, by at least one processor, the content of the menu information option displayed in each of the plurality of predetermined static active display positions, whilst the predetermined static active display positions are positionally maintained, in response to the detected movement of the contact point being inward or outward of the central position.

2. The method of claim 1 wherein the step of detecting movement of the contact point on the interactive surface includes a heuristic for determining that the movement of the contact point corresponds to a radial gesture based on an angle of the detected movement with respect to a radius extending from the central point.

3. The method of claim 2 wherein in the heuristic a detected movement within a predefined angle of a radius is determined to comprise a radial gesture.

4. The method of claim 2 further comprising determining the radial gesture as being inward or outward in dependence on whether, respectively, the radial gesture is toward or away from the central point.

5. The method of claim 1 further comprising the steps of:
 a. displaying a menu option in each of a plurality of inner display positions, each inner display position being associated with an active display position, each inner display position being located at one of a respective plurality of inner radial positions radiating from the central position, the inner radial positions being located a shorter distance from the central point than the respective active radial positions;
 b. changing the menu option displayed in each of the plurality of active display positions to the menu option in each of the plurality of associated inner display positions in response to the detected movement of the contact point being outward of the central position; and
 c. changing the menu option displayed in each of the plurality of inner display positions to the menu option in each of the plurality of associated active display positions in response to the detected movement of the contact point being inward of the central position.

6. The method of claim 1 further comprising the steps of:
 a. displaying a menu option in each of a plurality of outer display positions, each outer display position being located at one of a respective plurality of outer radial positions radiating from the central position, the outer radial positions being located a further distance from the central point than the respective active radial position;
 b. changing the menu option displayed in each of the plurality of active display positions to the menu option in each of the plurality of associated outer display positions in response to the detected movement of the contact point being inward of the central position; and
 c. changing the menu option displayed in each of the plurality of outer display positions to the menu option in each of the plurality of associated active display positions in response to the detected movement of the contact point being outward of the central position.

7. The method of claim 1 further comprising the step of rotating the menu option displayed in each of the plurality of active display positions in response to the detected movement of the contact point being rotational movement about the central position.

8. The method of claim 1 wherein the menu options in each of the active display positions represent a current set of menu options available for selection by a user.

9. The method of claim 1 in which the interactive display surface is a touch-sensitive display surface.

10. A non-transitory computer-readable medium storing a program causing a computer to execute the method according to claim 1.

11. A computer program product for storing computer program code which, when run on a computer, perform the method of claim 1.

12. A computer system associated with an interactive display surface, adapted for controlling the display of a user interface menu, the computer system comprising:
 a. a menu display module adapted to display a menu information option in each of a plurality of predetermined static active display positions, each display position being located at one of a respective plurality of active radial positions radiating from a central position; and
 b. a touch detection module adapted to detect movement of a contact point on the interactive display surface;
 c. wherein the menu display module is further adapted to change the content of the menu information option displayed in each of the plurality of predetermined static active display positions, whilst the predetermined static active display positions are positionally maintained, in response to the detected movement of the contact point being inward or outward of the central position.

13. The computer system of claim 12 further comprising a radial gesture recognition module adapted to detect movement of the contact point on the interactive surface as corresponding to a radial gesture, based on an angle of the detected movement with respect to a radius extending from the central point.

14. The computer system of claim 12 wherein the menu display module is further adapted to:
 a. display a menu option in each of a plurality of inner display positions, each inner display position being associated with an active display position, each inner display position being located at one of a respective plurality of inner radial positions radiating from the central position, the inner radial positions being located a shorter distance from the central point than the respective active radial positions;
 b. change the menu option displayed in each of the plurality of active display positions to the menu option in each of the plurality of associated inner display positions in response to the detected movement of the contact point being outward of the central position; and
 c. change the menu option displayed in each of the plurality of inner display positions to the menu option in each of the plurality of associated active display positions in response to the detected movement of the contact point being inward of the central position.

15. The computer system of claim 12 wherein the menu display is further adapted to:
 a. display a menu option in each of a plurality of outer display positions, each outer display position being located at one of a respective plurality of outer radial positions radiating from the central position, the outer radial positions being located a further distance from the central point than the respective active radial position;
 b. change the menu option displayed in each of the plurality of active display positions to the menu option in each of the plurality of associated outer display positions in response to the detected movement of the contact point being inward of the central position; and
 c. change the menu option displayed in each of the plurality of outer display positions to the menu option in each of the plurality of associated active display positions in response to the detected movement of the contact point being outward of the central position.

16. The computer system of claim 12 further comprising a rotational gesture recognition module adapted to:
 a. detect movement of the contact point being rotational movement about the central position,
 b. the menu display module being further adapted to rotate the menu option displayed in each of the plurality of active display positions on the active circumference in response thereto.

17. The computer system of claim 12 in which the interactive display surface is a touch-sensitive display surface.

18. The computer system of claim 12, further comprising an interactive display system.

* * * * *